Fig. 4

INVENTOR
JAMES R. DENNIS
BY Mason, Kolehmainen, Rathburn and Wyss.
ATTORNEYS

Oct. 7, 1958    J. R. DENNIS    2,855,596
RADIO NAVIGATION SYSTEM
Filed May 27, 1955    5 Sheets-Sheet 4

Fig. 5

INVENTOR
JAMES R. DENNIS
BY
Mason, Kolehmainen, Rathburn and Wyss
ATTORNEYS

Oct. 7, 1958 J. R. DENNIS 2,855,596
RADIO NAVIGATION SYSTEM
Filed May 27, 1955 5 Sheets-Sheet 5

INVENTOR
JAMES R. DENNIS
BY
ATTORNEYS

United States Patent Office 2,855,596
Patented Oct. 7, 1958

2,855,596

RADIO NAVIGATION SYSTEM

James R. Dennis, Tulsa, Okla., assignor to Seismograph Service Corporation, Tulsa, Okla., a corporation of Delaware Application May 27, 1955, Serial No. 511,632

28 Claims. (Cl. 343—105)

This invention relates generally to a new and improved radio navigation system and more particularly to apparatus operating in conjunction with radio position finding equipment to facilitate navigation of a mobile craft to any predetermined position.

Radio position finding systems of the type employing phase comparison in pairs of position indicating signals radiated from a plurality of spaced transmitting stations have been developed to the point where the position of a mobile receiving point relative to the known locations of the transmitting stations may be determined with a high degree of accuracy. In systems of this particular type, at least two indicating means, including phase comparison devices, are generally employed to provide indications representative of hyperbolic isophase lines having foci at different pairs of the transmitting stations and each passing through the location of the receiving point. Each of these indicating means customarily includes counters or other mechanism for measuring the number of complete revolutions of its phase comparison device in order to determine the number of lanes traversed by the mobile craft as it moves relative to the transmitting stations. In order to obtain a position fix accurately determinative of the location of the mobile craft, the navigator or pilot generally plots the readings of the indicating means on a chart of the area in which the mobile craft is operating, which chart is covered with a grid-like pattern of hyperbolic lines or coordinates representative of the different isophase positions occupied by the craft.

One of the principal problems confronting the navigator is that of determining the most expeditious manner of guiding the craft from the position defined by the indicating means, which will hereinafter be referred to as the "present craft position," to any desired target point. In moving the craft from one position to another, it is, of course, desirable to follow a direct or straight line in order to effect a saving in the time required to reach the desired destination and also to economize upon the fuel consumed by the craft in traversing the distance between the two positions. At the present time, the craft is generally guided by first determining the hyperbolic coordinates of the target point, next visualizing the difference in lane readings between the hyperbolic coordinates of the present position and those of the target position, and then mentally computing the desired rate of change of each of the indicating means as the craft approaches the target point. Obviously, such a procedure is laborious and time consuming and, in addition, is extremely inaccurate. Specifically, since the speed of the craft, the force and direction of the wind, and the magnitude and direction of the waves and currents when operating upon water all vary to a considerable extent during the movement of the craft to the target point it is exceedingly difficult to obtain accurate results by relying solely upon the skill of the operator in interpreting the readings of the indicating means. Furthermore, due to the movement of the craft and the resulting changes in the indicator readings, the "present position" determinations after translation into chart coordinates are not current, but instead, exhibit circumstances that existed at the time the indicator readings were made, thus requiring an extrapolation of the data derived from the chart in order to estimate the current conditions.

It would, therefore, be desirable to provide apparatus for continuously and automatically indicating the progress of the mobile craft as it approaches the target point. There have been a few prior art arrangements for providing such an indication but these have generally been susceptible to objection in that they have failed to take into account the many changing conditions encountered in different areas of operation within the hyperbolic field pattern of the position finding system. Thus, these prior art arrangements have resulted in the production of information lacking the accuracy necessary for successful use in a continuous wave system. Moreover, the information provided by many of these prior art devices has been presented in such manner that it is difficult to interpret with the result that only highly trained, skilled technicians are capable of operating the equipment.

One practical solution to the problems discussed above is disclosed and claimed in copending application of Beverly W. Koeppel, Serial No. 511,340, filed concurrently herewith and assigned to the same assignee as the present invention. The apparatus disclosed therein provides continuous indications on one or more meters from which the progress of the craft to the desired destination may be determined. In certain installations, however, it is difficult for an operator properly to interpret meter readings with the result that problems may be encountered in maintaining the craft on its desired course. In such installations it would be desirable to present the information concerning craft progress in a form which lends itself to a rapid extraction of useful data. Accordingly, it would be desirable to provide an oscilloscope type presentation wherein the position information is presented in "picture" form so that even a relatively unskilled operator may ascertain his progress by a glance at the "picture" or screen.

Accordingly, it is an object of the present invention to provide new and improved apparatus for providing continuous visual representation of the progress of a mobile craft when moving toward a predetermined target point.

Another object of the present invention is to provide an apparatus of the character described above for use in conjunction with radio position finding systems of the hyperbolic type.

It is a further object of the present invention to provide apparatus for presenting a continuous visual representation of the position and distance of a mobile craft from a predetermined target position.

Still another object of the present invention is to provide apparatus for use in radio position finding systems of the hyperbolic type to assist in navigation of a mobile craft by visually indicating the amount and direction of deviation of the craft from a direct course to a predetermined target point.

It is likewise an object of the present invention to provide apparatus for use in radio position finding systems of the hyperbolic continuous wave type which apparatus is responsive to radio signals corresponding to the geographical position of a mobile craft and to signals corresponding to a selected future position in order to provide a continuous visual presentation indicative of progress of the craft as it approaches the future position.

A further object of the invention is to provide an apparatus of the character set forth in the preceding paragraph wherein the data is presented in a form which may be readily and accurately interpreted by relatively unskilled operators.

The invention both as to its organization and method of operation together with further objects and advantages thereof will best be understood by reference to the specification taken in conjunction with the accompanying drawings in which.

Figures 1, 3:
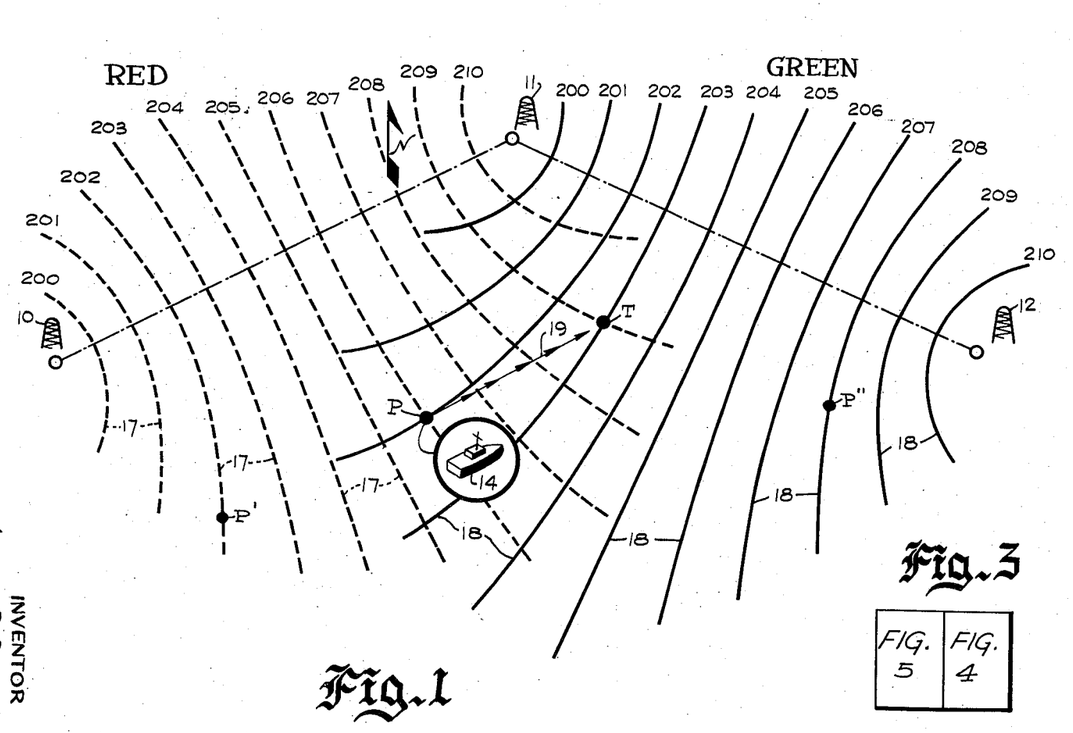
Fig. 1 is a diagrammatic representation of a three foci position indicating system together with the grid-like pattern of hyperbolic isophase lines associated therewith, and illustrates the desired course to be pursued by a mobile craft in moving between two spaced points in the pattern.

Referring now to the drawings, and more particularly to Fig. 1 thereof, there is illustrated a three foci hyperbolic system, preferably of the continuous wave type, for providing position information at mobile equipment 15 (Fig. 2) which may be carried by any number of crafts or vehicles 14 operated within the radius of transmission of a plurality of spaced transmitters or transmitting units 10, 11 and 12. The transmitting portion of the system may be of any well known type for radiating position indicating signals to the mobile craft where they may be phase compared in pairs in order to provide indications of the location of the mobile craft relative to the transmitting stations 10, 11 and 12. Specifically, the transmitting portion of the system may be identical to the transmitting equipment claimed and described in Patent No. 2,513,317, granted to James E. Hawkins and Robert S. Finn, on July 4, 1950 and assigned to the same assignee as the present invention. As a matter of fact, the equipment respectively provided at the transmitting stations 10, 11 and 12 illustrated in Fig. 1 may be identical to that employed at the transmitting units bearing the same reference numerals in the above-identified Hawkins and Finn patent. It should be understood, however, that other transmitting systems may be employed operating upon the heterodyne principle as disclosed in Patent No. 2,148,267 to E. A. H. Honore, granted February 21, 1939 or, for that matter, a synchronized transmitting system could be used.

In any event, the waves radiated from the transmitters 10, 11 and 12 are received at the mobile equipment 15 and the phase relationship between the waves received from transmitters 10 and 11 is determined in order to provide an indication of the location of the mobile craft 14 relative to adjacent isophase lines of a family of hyperbolas having foci at the transmitters 10 and 11. These hyperbolas are represented by the broken lines 17 in Fig. 1 and, for convenience, are hereinafter referred to as Red hyperbolas. In similar manner, the phase relationship between the signals received from transmitters 11 and 12 is determined in order to provide an indication of the location of the mobile craft relative to adjacent isophase lines of a family of hyperbolas having foci at the transmitters 11 and 12. The latter hyperbolas are represented by the solid lines 18 shown in Fig. 1 and are hereinafter referred to as Green hyperbolas.

Figure 2:
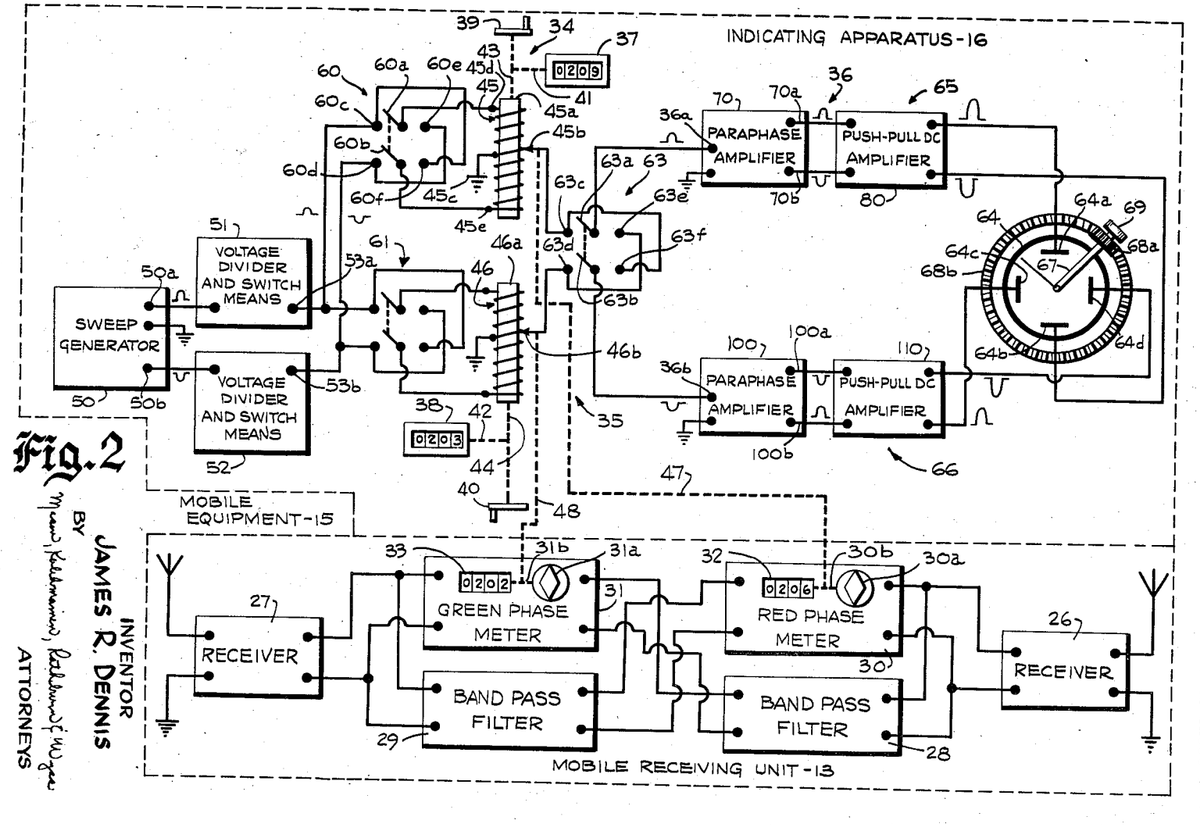
Fig. 2 diagrammatically illustrates apparatus characterized by the features of the present invention.

Specifically, referring to Fig. 2 of the drawings, the mobile equipment 15, includes a mobile receiving unit 13 for providing the position indications described above and indicating apparatus 16 for continuously indicating the progress of the mobile craft as it approaches a predetermined target position in a manner to be described in detail hereinafter. The mobile receiving unit 13 is identical to that shown in the above identified patent to Hawkins and Finn, and includes receivers 26 and 27, band pass filters 28 and 29, and phase meters 30 and 31 all functioning in the manner described in the patent to provide position indications upon the phase meters 30 and 31 accurately representative of the location of the mobile craft 14. It should be understood that the mobile receiving unit shown in Fig. 2 is merely illustrative of a particular apparatus which can be employed in the system of the present invention, since any receiving apparatus providing the required hyperbolic position indications may be used. The phase meter 30, as indicated above, provides an indication representative of the location of the mobile craft along one of the hyperbolic lines of the Red family while the phase meter 31 provides an indication of the location of the mobile craft along one of the hyperbolic lines of the Green family. Thus, the phase comparisons effected by the phase meters 30 and 31 identify a pair of intersecting isophase lines passing through the location of mobile craft 14. These phase meter indications may be used in conjunction with a chart containing a hyperbolic grid representative of the isophase lines in order to transform the phase measurements into a geographical position fix. Such a chart may be somewhat similar in appearance to that shown in Fig. 1 although, in order to facilitate the illustration, the latter depicts only a representative few of the hyperbolic lines actually shown on the chart.

The measurements provided by the phase meters 30 and 31 are ambiguous in the sense that they do not identify the particular hyperbolic lines upon which the mobile craft is located. To resolve this ambiguity, the phase meters 30 and 31 may respectively include rotatable indicating elements 30a and 31a mechanically coupled, as indicated by the broken lines 30b and 31b, to integral counter 32 and 33, respectively, which function to count each 360 degree revolution of the rotatable indicating elements and, hence, identify the number of lanes traversed by the craft 14, a lane being defined as the distance between adjacent isophase lines. In order to correlate the indications on the phase meters and their associated counters with the isophase lines appearing on the chart, the craft 14 may initially enter the radiation field of the transmitters 10, 11 and 12 at a known geological location at which time the rotatable indicating elements 30a and 31a and the counters 32 and 33 may be manually indexed to correspond to the known location.

From the foregoing explanation, it will be recognized that the counters 32 and 33 identify the lanes within which the craft 14 is located while the phase meters 30 and 31 accurately define the position of the craft within the identified lanes. This position is indicated as P in Fig. 1 and, for the purpose of illustration, is shown as being located at the intersection of hyperbola number 206 of the Red family and hyperbola number 202 of the Green family, the numbers being assigned merely to facilitate identification of the different hyperbolic lines. The invention will perhaps be best understood by considering the solution of a specific navigation problem and by describing the mode of operation of the apparatus involved in effecting such a solution. Thus, as illustrated in Fig. 1, it is desired to navigate the craft 14 from the point P to that labeled T which may be termed the preplot or target point and which is defined by the intersection of hyperbola number 209 of the Red family and by hyperbola number 203 of the Green family. In order to conserve fuel and to reach the desired destination in a minimum amount of time, it is, of course, desirable that the craft follow a straight line represented by the arrow pointed line 19.

In order for the mobile craft to reach the target point, the rotatable element 30a of the phase meter 30 reading the Red hyperbolas must make three complete revolutions in the proper direction to increase the reading of the lane counter 32 from 206 to 209 while at the same time the rotatable element 31a must make one complete revolution in a proper direction to increase the reading on lane counter 33 from 202 to 203. As a consequence, in order for the craft 14 to pursue a direct path to the target point, it must be guided in such direction that the rate of change of the indications appearing on Red phase meter 30 and lane counter 32 is approximately three times the rate of change of the indications appearing on Green phase meter 31 and lane counter 33. In actual practice, the adjacent isophase hyperbolic lines are not so widely spaced as illustrated in Fig. 1 and, accordingly, the lines will not diverge as rapidly as those there depicted. Thus, if the target point is spaced a distance of several lanes of both the Red and Green families from the craft 14, the spacing of the hyperbolas will be practically uniform.

In accordance with the present invention, navigation of the craft 14 in approximately a straight line path to the target point, is facilitated by cooperation between the indicating apparatus 16 and the mobile receiving unit 13 described above. To this end, as best shown in Fig. 2, the indicating apparatus 16 comprises a signal producing means, indicated generally as 34, for developing an output signal corresponding to the difference in Red hyperbolic isophase lines from the position of the craft to the target point, a signal producing means, indicated generally as 35, for developing an output signal corresponding to the difference in Green hyperbolic isophase lines from the position of the craft to the point T, and a visual indicating device designated as 36 jointly responsive to the output signals developed by the means 34 and 35 for portraying the direction and amount of deviation of the craft 14 from the desired course and also for continuously displaying the number of hyperbolic lines separating the mobile craft and the target point. Specifically, each of the signal producing means 34 and 35 includes a manually settable preplot counter, these being designated as 37 and 38 and being respectively indicative of the hyperbolic lines or coordinates of the Red and Green families intersecting at the preplot point T.

To facilitate adjustment of the preplot counters 37 and 38 to desired settings corresponding to the coordinates of the target point, there are provided manually operable cranks or handwheels 39 and 40 respectively connected to the counters 37 and 38 by suitable mechanism indicated by the broken lines 41 and 42. The handwheels 39 and 40 are also mechanically connected through suitable coupling means, indicated by broken lines 43 and 44, to the casings or slide wire supports 45a and 46a of displacement potentiometers 45 and 46, respectively. The variable tap or slide 45b of the potentiometer 45 is connected through mechanism, which may include speed reduction gears although these are not shown in the drawings and which is represented by broken line 47, to be driven by the rotatable indicating element 30a of the Red phase meter 30. Thus, the potentiometer 45 is differentially driven in accordance with the difference between the reading appearing on the preplot counter 37 and that appearing on the phase meter 30 and its associated lane counter 32 with the result that the amplitude of the output signal of potentiometer 45 appearing between variable tap 45b and ground varies as a function of this difference. Since the center of the slide wire of potentiometer 45 is grounded, as indicated at 45c, the polarity of the output signal is a function of the relative magnitudes of the readings appearing upon the preplot counter 37 and the lane counter 32. Thus, if the reading of the preplot counter 37 exceeds that of the lane counter 32 the output signal is of one polarity and, conversely, when the reading of the preplot counter is less than that of the lane counter, the polarity of the output signal is reversed.

In similar manner, the variable tap or slide 46b of the potentiometer 46 is connected through suitable mechanism, indicated by the broken line 48, to be driven by the rotatable indicating element 31a of the Green phase meter 31 with the result that the amplitude of the output signal of potentiometer 46 appearing between variable tap 46b and ground varies as a function of the difference between the reading of the preplot counter 38 and that of the Green phase meter 31 and its associated lane counter 33. Moreover, for the reasons pointed out above, the polarity of the output signal of potentiometer 46 is a function of the relative magnitudes of these readings.

In order to provide excitation signals for the displacement potentiometers 45 and 46, the indicating apparatus 16 includes a sweep generator 50 which functions in a manner to be described more fully hereinafter continuously to develop, between each of its opposed output terminals 50a and 50b and ground, unidirectional or half-wave rectified signals of equal amplitude and phase but of opposite polarity, as indicated by the representative wave forms illustrated adjacent the terminals 50a and 50b in Fig. 2. Since the polarity of the signals appearing between terminal 50a and ground is positive, this will be designated as the positive terminal and, correspondingly, the terminal 50b is designated as the negative terminal due to the polarity of the unidirectional signals appearing thereon.

To provide for application across the slide wires of potentiometers 45 and 46 of selected portions of the output signals appearing upon terminals 50a and 50b, there are provided circuits designated as voltage divider networks and manually operable switching means 51 and 52. The voltage divider networks of these circuits 51 and 52 are respectively connected to terminals 50a and 50b in order to provide load circuits across which the output signals of the sweep generator 50 are developed. The switching means to be described more fully hereinafter function to pick off selected portions of the developed signals in order to produce positive unidirectional signals between positive terminal 53a and ground and to produce negative unidirectional signals appearing between negative terminal 53b and ground.

The signals appearing between the output terminals 53a and 53b are applied across the opposed ends of the slide wires of potentiometers 45 and 46 through manually and independently operable polarity reversing switches 60 and 61 of the double-throw, double-pole type, the function of which will become evident as the description proceeds. Briefly, however, the switches 60 and 61 may be employed selectively to change the polarity of the output signal from either or both of the potentiometers 45 and 46. Thus, when the electrically insulated poles or movable arms 60a and 60b of the switch 60 occupy the left hand position shown in Fig. 2, they are in respective engagement with fixed contacts 60c and 60d to connect the positive terminal 53a to terminal 45d of the potentiometer 45 and to connect negative terminal 53b to terminal 45e. When, on the other hand, the poles 60a and 60b occupy the right hand position shown in Fig. 2, they are brought into engagement with stationary contacts 60e and 60f to connect the negative terminal 53b to terminal 45d of the potentiometer and to connect the positive terminal 53a to terminal 45e. Thus, by selective operation of the switch 60, the polarity of the output signal from the potentiometer 45 may be made either positive or negative for any position of the variable tap 45b. In similar manner, the switch 61 may be selectively operated to change the polarity of the output signal of potentiometer 46 for any position of the variable tap 46b.

The output signals of potentiometers 45 and 46 are passed through a deflection reversing switch 63 to input terminals 36a and 36b of the visual indicating device 36. The latter device comprises a cathode ray tube 64 of conventional construction for producing a visual representation of the movement of the mobile craft towards the target point T, together with a vertical deflection channel indicated generally as 65 for deflecting the electron beam of the cathode ray tube in a vertical direction and a horizontal deflection channel 66 for deflecting the beam in a horizontal direction. The input signal for the vertical deflection channel 65 appearing between terminal 36a and ground is applied to a paraphase amplifier 70 which functions in a manner described more fully below to convert the half-wave rectified input signals to a pair of in-phase, push-pull output signals having equal amplitudes but opposite polarities as indicated in Fig. 2 by the wave forms appearing adjacent the output connectors 70a and 70b of the paraphase amplifier. The balanced signals produced by the paraphase amplifier 70 are applied to a push-pull amplifier 80 which functions in conventional manner to amplify the input signals applied thereto and provides excitation signals for the upper and lower vertical deflection plates 64a and 64b of the cathode ray tube 64.

Similarly, the input signal to the horizontal deflection channel 66 appearing between terminal 36b and ground is applied to a paraphase amplifier 100 comprising the input stage of the horizontal deflection channel. The paraphase amplifier 100 functions in a manner similar to the paraphase amplifier 70 to convert the half-wave rectified signals impressed across its input circuit to a pair of in-phase, equal amplitude, half-wave rectified signals of opposite polarity as indicated in Fig. 2 by the wave forms appearing adjacent signal connectors 100a and 100b at the output of the amplifier 100. The balanced output signals appearing upon connectors 100a and 100b are amplified by push-pull amplifier 110 in order to develop excitation signals for the opposed horizontal deflection plates 64c and 64d of the cathode ray tube.

As previously mentioned, the output signals of potentiometers 45 and 46 are respectively indicative of the number of hyperbolic lines of the Red and Green families which must be traversed by the mobile craft before it arrives at the target point T. By operation of the deflection reversing switch 63, the output signal of the potentiometer 45 may be selectively supplied to either one of the deflection channels 65 or 66 while at the same time the output signal of potentiometer 46 is supplied to the other channel. Thus, with the poles or movable arms 63a and 63b of the switch 63 in the left hand position shown in Fig. 2 in respective engagement with fixed contacts 63c and 63d, the output signal of potentiometer 45 is supplied to the vertical deflection channel 65 and the output signal of potentiometer 46 is supplied to the horizontal deflection channel 66. When, on the other hand, the movable arms 63a and 63b occupy the right hand position in engagement with stationary contacts 63e and 63f, respectively, the output signal of potentiometer 45 is applied to the horizontal deflection channel and the output signal of potentiometer 46 is applied to the vertical deflection channel. Assuming that the variable taps of the potentiometers 45 and 46, the switches 60 and 61, and the switch 63 are so positioned that positive unidirectional signals are impressed between terminal 36a and ground and negative unidirectional signals are impressed between the terminal 36b and ground, the wave forms illustrated in Fig. 2 are developed at the output sides of the paraphase amplifiers 70 and 100 and at the output sides of push-pull amplifiers 80 and 110.

From the foregoing description, it will be observed that the upper and lower vertical deflection plates 64a and 64b of the cathode ray tube 64 are energized by in-phase, oppositely polarized signals of equal amplitude, while the opposed horizontal deflection plates 64c and 64d are energized by oppositely polarized, equal amplitude signals which are not only in phase with each other but are also in phase with the signals applied to the vertical deflection plates. Under the conditions outlined above and with the wave forms illustrated in Fig. 2 applied to the horizontal and vertical deflection plates, it is apparent that the electron beam of the cathode ray tube 64 will be deflected upwardly and to the left as viewed in Fig. 2 to produce a trace on the screen of the tube having a length which represents a vector addition of the peak amplitudes of the signals from amplifiers 80 and 110. Since the peak amplitudes of the latter signals are, as previously mentioned, proportional to the number of Red and Green hyperbolic lines which the mobile craft must traverse to reach the target point T, the length of the trace on the screen is continuously indicative of the "range" to the target point in terms of the number of hyperbolic lines to be crossed. The end of the trace near the center of the screen thus represents the target point while the outer end of the trace represents the position of the mobile craft.

From the foregoing discussion, it will be observed that the angular orientation of the trace on the screen is a function of the relative amplitudes of the signals from amplifiers 80 and 110. Thus, with a signal of very small amplitude from amplifier 110 and a much larger signal from amplifier 80, the trace will be substantially vertical while a small signal from amplifier 80 and a much greater signal from amplifier 110 produces a substantially horizontal trace. Equal amplitude signals from amplifiers 80 and 110 produce a trace which is oriented at 45° with respect to the horizontal axis of the screen as illustrated by the trace appearing on the screen of the cathode ray tube 64 shown in Fig. 2. Such a trace indicates that the output signals from potentiometers 45 and 46 are equal and, hence, the readings on the phase meters 30 and 31 and their associated lane counters 32 and 33 should change at equal rates if the mobile craft is to follow a direct line path to the target point. When the trace is vertical, the reading on one of the phase meters and its associated lane counter coincides with the reading on its associated preplot counter and, hence, the craft should be navigated in such manner that only the readings on the other phase meter and its lane counter will change. Thus, the angular position of the trace on the screen of the tube indicates the desired rate of change of the position indications provided by the phase meters 30 and 31 and their associated lane counters.

To facilitate interpretation of the information appearing upon the screen of the cathode ray tube 64, there is provided a movable cursor 67 which is preferably oriented in alignment with the trace produced when the mobile craft 14 is positioned at initial point P. To provide for adjustment of the position of the cursor, the latter may be carried upon suitable mechanism including a gear 68a meshing with a ring gear 68b surrounding the tube 64. The gear 68a may be turned by a manually operable adjusting knob 69 to move the cursor 67 to the desired angular position overlaying the screen of the cathode ray tube.

After the cursor has been properly oriented to establish a direct line between the initial position on the screen when the craft is at point P and the center of the screen, the craft is preferably navigated so as to maintain the trace in alignment with the cursor. If the craft deviates from the desired straight line course to the target point, the signals from potentiometers 45 and 46 reflect the deviation and induce a departure of the trace from alignment with the cursor 67. The navigator or operator, upon observing such a departure, may immediately take the necessary steps to bring the craft back on course.

Figure 6:
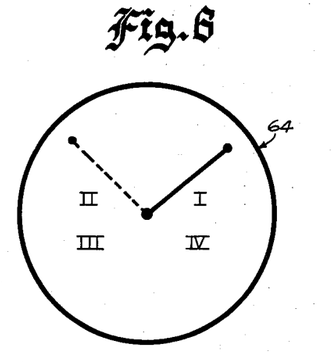
Figs. 6, 7 and 8 illustrate the indications provided by the apparatus of the present invention as the mobile craft is navigated in different directions in the radio position finding system shown in Fig. 1.

The polarity reversing switches 60 and 61 and the deflection reversing switch 63 may be employed to effect correlation between the direction of deviation of the trace from the cursor 67 and the direction of departure of the mobile craft from the desired course. Thus, if the craft is to the right of its desired course, it is desirable that the trace be deflected in a corresponding direction from the cursor 67 in order to avoid confusion in the interpretation of the information presented on the screen of the cathode ray tube. Moreover, it would be desirable to orient the trace on the screen in a position approximately corresponding to the actual course of the craft. Thus, if it is desired to navigate the craft in a southwestern direction to reach the target point and if the screen of the tube is considered to be divided into four quadrants labeled by the appropriate Roman numerals appearing upon the face of the cathode ray tube 64 shown in Fig. 6, it would be desirable to have the trace fall in the first quadrant as represented by the solid line. If, on the other hand, the craft is headed in a southeastern direction, the trace should preferably fall within the second quadrant as represented by the dotted line shown in Fig. 6, and so on. Furthermore, since the hyperbolic isophase lines in different systems, i. e., in systems where the transmitters are not arranged as shown in Fig. 1, will probably lie at different angles with respect to magnetic north, the trace should appear in the proper quadrant to portray a true and accurate picture of the movement of the craft with respect to magnetic north irrespective of the relative orientation of the hyperbolas.

Figure 7:
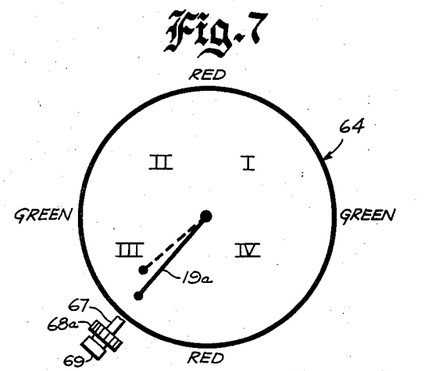

In order to effect a solution of all of the problems just discussed, the polarity reversing switches 60 and 61 and the deflection reversing switch 63 may be thrown to the proper position at the inception of the investigation or survey being conducted. Thus, in the navigation of the mobile craft within the hyperbolic system shown in Fig. 1, if it is desired to move the craft along the line 19 in a substantially northeastern direction from the point P to reach the target point T, the trace on the screen should appear in the third quadrant as shown in Fig. 7. Thus, the electron beam of the cathode ray tube should be deflected downwardly and to the left as viewed in Fig. 2 and, accordingly, the switches 60 and 61 should be so positioned that a negative signal is supplied to both the vertical and horizontal deflection channels 65 and 66. Since the readings on the phase meters 30 and 31 and their associated lane counters 32 and 33 are increased when the cranks 39 and 40 are rotated, the variable taps 45b and 46b will be driven in a given direction as, for example, in an upward direction as viewed in Fig. 2. Then as the craft moves toward the target point the variable taps will tend to return to their center or zero positions. Hence, the switches 60 and 61 must both be thrown to their right hand positions shown in Fig. 2 in order to produce negative unidirectional signals at the output of both of the potentiometers 45 and 46. When these signals are applied to the vertical and horizontal deflection channels, the trace will appear in the third quadrant on the screen of the cathode ray tube as represented by the solid line 19a shown in Fig. 7 of the drawings.

In order that the trace will be deflected from beneath the cursor 67 in the proper direction if the mobile craft deviates from the desired course, the deflection reversing switch 63 is thrown to the left hand position shown in Fig. 2 so that the output of the Green potentiometer 46 is applied to the horizontal deflection channel 66 and the output of the Red potentiometer 45 is applied to the vertical deflection channel 65. Thus, if the craft deviates to the left of desired course the Red hyperbolic lines will be traversed at a rate in excess of the desired rate and the output signal of the Red potentiometer 45 will be lower than would be the case if the craft were on course. Similarly, the rate of traversing the Green hyperbolas will be too low and the output signal from the Green potentiometer 46 will exceed the oncourse value. Thus, referring to Fig. 7 of the drawings, decreased output from Red potentiometer 45 to the vertical deflection channel 65 causes the trace to be deflected slightly in an upward direction, while the increased output from Green potentiometer 46 to the horizontal channel 66 causes the trace to be deflected slightly to the left. Hence, the trace occupies the dotted line position shown in Fig. 7 and, since the trace appears to the left of the cursor 67 and the mobile craft is to the left of the desired course, the presentation can be accurately interpreted with facility. In view of the above description, it will be apparent that deviation of the mobile craft to the right of the desired course causes the trace on the cathode ray tube to appear on the right of the cursor 67.

As long as the mobile craft is operating within a particular area of the system shown in Fig. 1, the switches 60, 61 and 63 will not be disturbed. Thus, if it is desired to direct the ship in a southwest direction from point P, the readings on phase meters 30 and 31 and lane counters 32 and 33 must decrease. With the switches 60 and 61 in their right hand positions shown in Fig. 2 and with the switch 63 in its left hand position, the signals applied to the deflection channels 65 and 66 will both be positive due to the fact that the variable taps of potentiometers 45 and 46 are both driven in a downward direction upon rotation of the cranks 39 and 40 when the preplot counters are set to the desired positions. When positive signals are applied to both of the deflecting channels 65 and 66, the polarities of the signals from amplifiers 80 and 110 are such that the trace will fall within the first quadrant as shown by the solid line 19a in Fig. 8. If the craft veers to the left of the desired course, the Red hyperbolas will be traversed too rapidly and the output signal from the Red potentiometer will be too small while, at the same time, the output signal from the Green potentiometer is too large. The trace will thus be deflected downwardly and to the right and will occupy the position represented by the dotted line in Fig. 8. Thus, the switches 60 and 61 and the deflection reversing switch 63 just described may be selectively employed to insure that the trace appearing on the screen is accurately representative of the conditions existing with respect to the movement of the craft thereby to facilitate interpretation of the information appearing on the screen of the cathode ray tube 64 for operation of the craft with the area located in the vicinity of point P.

For other areas of operation within the system shown in Fig. 1, however, it may be desirable to alter the position of the deflection reversing switch 63 in order to orient the trace on the cathode ray tube in proper position. Thus, in areas where the Red hyperbolas extend substantially in a north-south direction, as, for example, in the area surrounding point P' in Fig. 1, the output of the Red potentiometer 45 should be applied to the horizontal deflection channel 66 and the output of the Green potentiometer 46 should be applied to the vertical deflection channel 65. Under these conditions, if the craft is directed north or south from point P', the output of the Red potentiometer will be approximately zero and the trace on the screen will be deflected substantially in a vertical direction as desired. Similarly, if the craft is directed east or west from point P', the output of the Green potentiometer will be very small and the trace will be deflected substantially horizontally. In order to apply the output of the Green potentiometer 46 to the vertical deflection channel, the deflection reversing switch must be thrown from the left hand position described above to the right hand position shown in Fig. 2.

If, on the other hand, the mobile craft is operating in an area within the system shown in Fig. 1 where the Green hyperbolas extend in a substantially vertical direction, as for example, in the vicintiy of the point P'', the output of the Red potentiometer 45 should be applied to the vertical deflection channel 65 and the output of the Green potentiometer should be applied to the horizontal deflection channel 66. Under the latter conditions, movement of the craft 14 in a north or south direction from point P" produces a very small output signal from the Green potentiometer and the trace will be deflected vertically as desired. Similarly, movement of the craft in an east or west direction from point P" induces practically no signal output from the Red potentiometer 45 and the trace will be deflected horizontally. Thus, the deflection reversing switch 63 is employed to induce correspondence between the direction of movement of the craft and the deflection of the trace appearing on the screen of the cathode ray tube 64 for all positions of the craft 14 within the system shown in Fig. 1. However, over an area of considerable extent the orientation of the hyperbolas does not change appreciably and, accordingly, a large number of relatively short runs can be made without altering the position of the switch 63.

Figures 8, 9, 10:
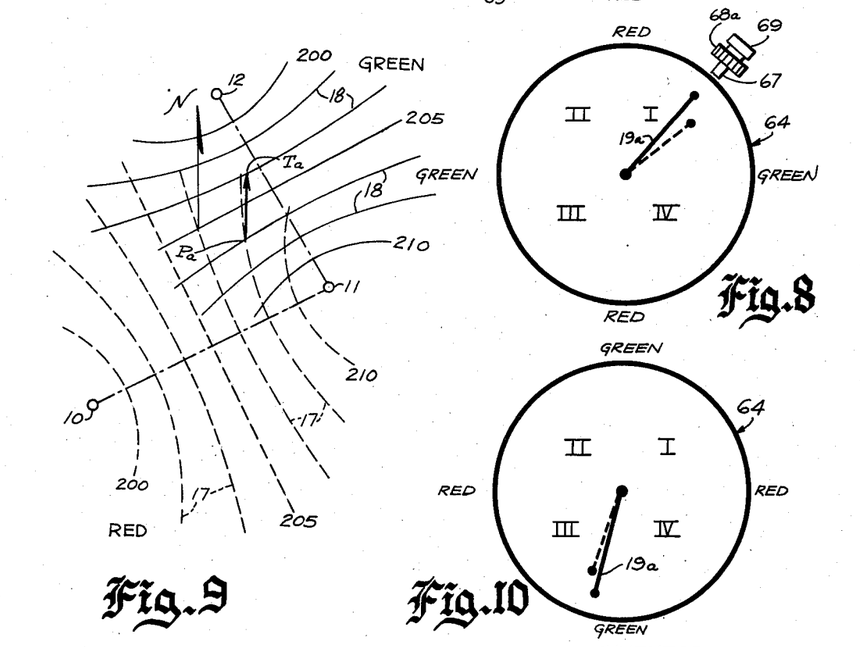
Fig. 9 diagrammatically illustrates an alternative arrangement of the transmitters shown in the system of Fig. 1 to effect a different orientation of the grid-like pattern of hyperbolic lines.
Fig. 10 illustrates the indications provided by the apparatus of the present invention as the mobile craft is navigated within the radius of transmission of the signals radiated by the system shown in Fig. 9.

Moreover, if the mobile craft is operated in a hyperbolic system having the hyperbolas oriented differently with respect to magnetic north as, for example, in a system employing the transmitters 10, 11 and 12 positioned as shown in Fig. 9, the switches 60, 61 and 63 are employed to provide the desired indications on the cathode ray tube. Thus, if it is desired to navigate the craft approximately due north along a straight line interconnecting an initial craft position $P_a$ to a target point $T_a$, in Fig. 9, the indications on the Red phase meters 30 and the lane counter 32 must increase only slightly while those on the Green phase meter 31 and lane counter 33 must decrease to a larger extent. As a consequence, the signal from the Green potentiometer 46 will be relatively large while that from the Red potentiometer 45 will be much smaller. Moreover, the variable tap 46b will be driven in a downward direction as viewed in Fig. 2 due to the decreasing readings on phase meter 31 while the variable tap 45b will be driven upwardly since the readings on phase meter 30 are increasing. Since it is desirable to deflect the trace substantially in a vertical direction as shown in Fig. 10, the large signal from the Green potentiometer 45 is supplied to the vertical deflection channel 65 while the smaller signal from the Red potentiometer 46 is supplied to the horizontal deflection channel. Moreover, since it is desirable that the trace appear between the third and fourth quadrants as shown in Fig. 10 of the drawings in order to indicate the due north heading, the polarity reversing switch 61 is thrown to the left hand position shown in Fig. 2 to apply a negative signal to the vertical deflection channel 65 from the downwardly driven tap 46b of the Green poentiometer. The polarity reversing switch 60, on the other hand, is thrown to the right hand position shown in Fig. 2 in order to supply a very small negative signal to the horizontal deflection channel 66. Thus, the trace appears at a very slight angle with respect to the vertical, as shown by the solid line 19a in Fig. 10, but nevertheless approximates the due north heading of the mobile craft.

If the craft tends to veer to the left of the desired straight line course shown in Fig. 9, the Red hyperbolas will be traversed too slowly and the output signal of the Red potentiometer 45 will be too high. Thus, the trace will be deflected to the left and will occupy the dotted line position shown in Fig. 10. Hence, the indication appearing on the screen of the cathode ray tube corresponds to the actual conditions existing with respect to the progress of the craft.

From the foregoing description, it will be apparent that proper operation of the switches 60 and 61 and the deflection reversing switch 63 will enable the operator to correlate the craft movement with the presentation appearing on the screen in any hyperbolic system irrespective of the orientation of the hyperbolas. Thus, for all areas of operation a readily interpretable picture in two dimensions of the movement of the craft is presented.

Figure 4:
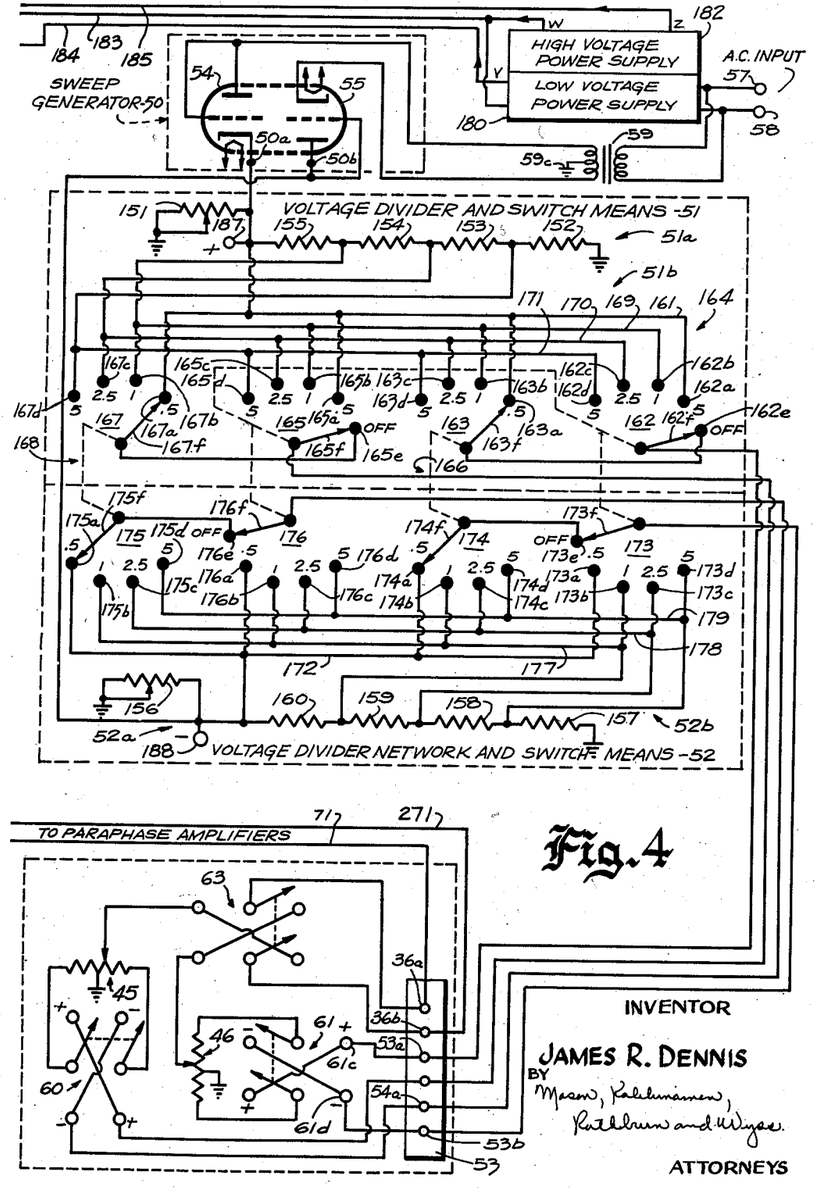
Figs. 4 and 5 are schematic diagrams illustrating certain of the circuits shown in Fig. 2 and when placed side by side in the manner illustrated in Fig. 3 comprise the improved apparatus of the present invention.
Figure 5:
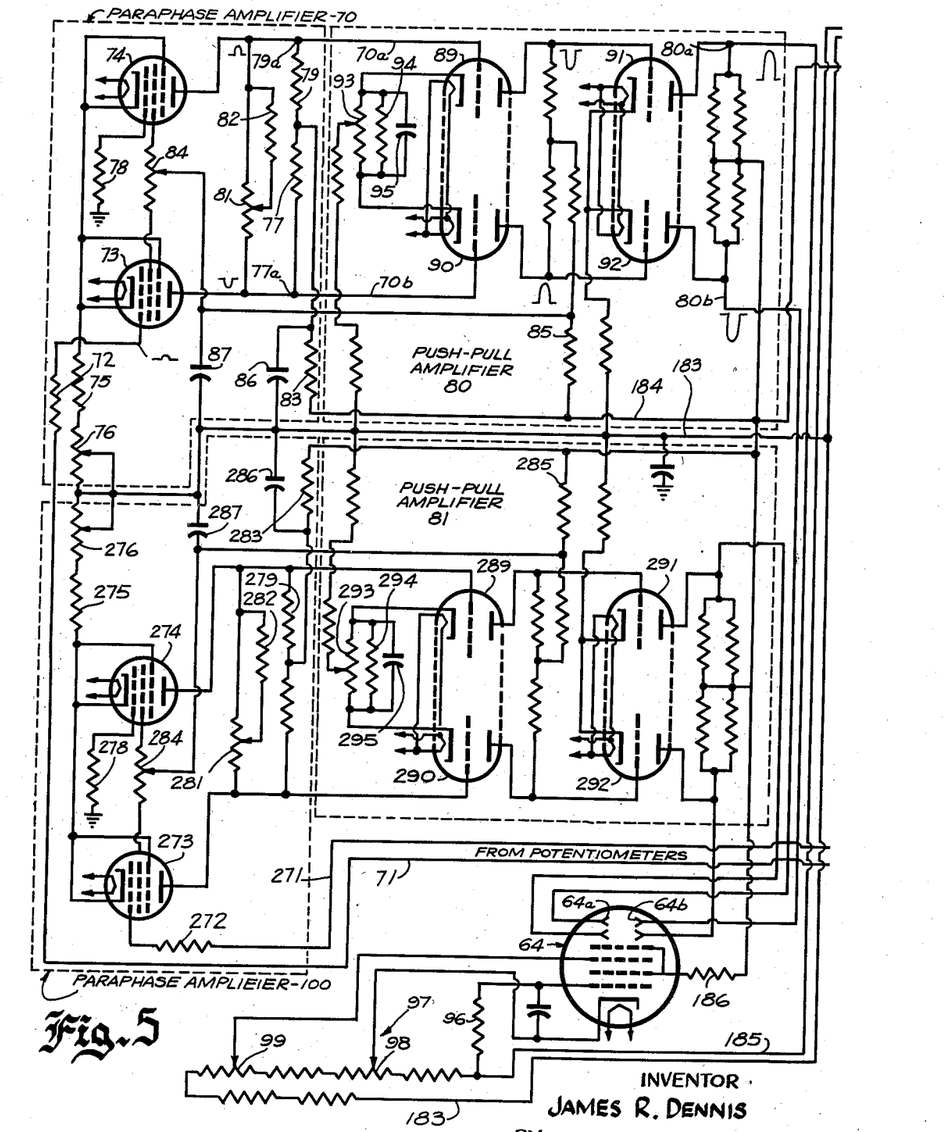

Referring now to Figs. 4 and 5, which are adapted to be placed in side by side relationship as shown in Fig. 3, for a description of the operation of the circuits shown in block form in Fig. 2, it will be observed that the sweep generator 50 (Fig. 4) comprises a pair of triodes 54 and 55, which possess approximately identical operating characteristics and, hence, are preferably embodied within a single vacuum tube. Each of these triodes has its control grid and plate connected together so that it effectively functions as a half wave rectifier. The sweep generator 50 is energized by alternating current signals from the secondary winding of a transformer 59, the primary winding of which is actuated by power applied between input terminals 57 and 58 from a suitable source not shown. Thus, the plate and control grid of the triode 54 are connected to one end of the secondary winding of transformer 59 and the cathode of triode 55 is connected to the other end of this winding. Since the center tap of the secondary winding is grounded, as indicated at 59c, the triodes 54 and 55 function as half wave rectifiers to develop unidirectional signals of equal amplitude and opposite polarity between each of the terminals 50a and 50b and ground.

As previously mentioned, the signals appearing between the positive terminal 50a and ground and those appearing between the negative terminal 50b and ground are applied to the potentiometers 45 and 46 through voltage divider networks and switching means 51 and 52, respectively, in order to provide for the selective control of the length of the trace on the screen of the cathode ray tube 64 in correlation with the "distance" of the target point T from the mobile craft 14. The term "distance" as used above actually refers to the number of hyperbolas or hyperbolic lanes between the target point and the mobile craft and not to the actual range in feet or yards. More particularly, the signals appearing at the positive terminal 50a are developed across a voltage divider network designated generally as 51a and comprising sweep adjusting potentiometer 151 connected in shunt with a plurality of series connected resistors 152, 153, 154, and 155. Similarly, the signals appearing upon negative terminal 50b are developed across a voltage divider network indicated generally as 52a and comprising sweep adjusting potentiometer 156 connected in parallel with a plurality of series connected resistors 157, 158, 159 and 160.

To facilitate the application of unidirectional signals of different preselected amplitudes to the potentiometers 45 and 46 in order to increase the sensitivity of the indicating apparatus 16 as the mobile craft approaches the target point, the signals appearing upon various points of the voltage divider networks 51a and 52a are respectively applied to switching means indicated generally as 51b and 52b. Specifically, the positive terminal 50a is connected through conductor 161 to fixed contacts 162a and 165a of sections 162 and 165 of a four-section, multi-position joint range switch 164. The conductor 161 is also connected to fixed contact 163a of section 163 of a two-section, multi-position Green range switch 166 and to fixed contact 167a of section 167 of a two-section, multi-position Red range switch 168. The range switches 164, 166 and 168 are manually and independently operable, although the Green and Red range switches 166 and 168 are adapted to be effective only when the switch 164 is in the "off" position shown in Fig. 4. The four sections of the switch 164 provide for simultaneous control of the amplitude of the signals applied to both of the potentiometers 45 and 46. When switch 164 is in its "off" position, Green range switch 166 may be employed to control the amplitude of the signals applied to the Green potentiometer 46 while, at the same time, the Red range switch 168, which is operated independently of switch 166, may be employed to control the amplitude of the signals applied across the Red potentiometer 45.

The junction points between the series connected resistors 152, 153, 154 and 155 of the voltage divider network 51a are connected through conductors 169, 170 and 171 to the other fixed contacts of sections 162, 163, 165 and 167 of the range switches in the manner illustrated in Fig. 4. The fixed contacts of these sections have been assigned reference numerals corresponding to the switch section but suffixed by a suitable letter of the alphabet. Similarly, the negative terminal 50b is connected through conductor 172 to fixed contacts 173a and 176a of sections 173 and 176 of the range switch 164, to fixed contact 174a of the second section 174 of the Green range switch 166, and to fixed contact 175a of the second section 175 of the Red range switch 168. The junction points between the series connected resistors 157, 158, 159 and 160 of the voltage divider network 52a are connected through conductors 177, 178, and 179 to the remaining appropriately labeled, stationary contacts of sections 173, 174, 175 and 176 of the range switches in the manner illustrated in Fig. 4.

Referring now to the operation of the voltage divider networks and switching means 51 and 52, it will be apparent that the amplitudes of the signals developed across output terminals 50a and 50b of the sweep generator 50 are independent of the position occupied by the movable arms of the switching means 51b and 52b. The voltages appearing at the junction points of the series connected resistors of the voltage divider networks 51a and 52a are, of course, a function of the relative sizes of the resistors. These voltages may obviously be varied by employing resistors of different size, if desired, but, to facilitate the explanation, it will be assumed that the resistance of each of the series connected resistors is fixed. The voltages supplied to the fixed contacts of the range swiches 164, 166 and 168 may, however, be varied to some extent by adjustment of the sweep potentiometers 151 and 156 connected in parallel with the series connected resistors of each of the voltage divider networks 51a and 52a.

In any event, when the movable arms or poles 162f, 165f, 173f and 176f of the four sections of the joint range switch 164 are in respective engagement with the stationary contacts bearing appropriate reference numerals suffixed by the letter "e," the range switch 164 is in its "off" position, and the Green and Red range switches 166 and 168 may be employed to control the amplitudes of the signals applied across the slide wires of the displacement potentiometers 45 and 46. Thus, with the movable arms 163f and 174f of the Green range switch 166 in respective engagement with contacts 163d and 174d, positive unidirectional signals of relatively small amplitude developed across resistor 152 are passed through the closed contacts of switch section 163 and through the closed contacts of switch section 162 to terminal 53a connected directly to fixed contact 61c of the polarity reversing switch 61. At the same time, fixed contact 61d of the switch 61 is energized by negative unidirectional signals of relatively small amplitude developed across resistor 157 which are passed through the closed contacts of switch section 174 and through the closed contacts of switch section 173 to terminal 53b on the terminal plate 53. Switch 61 may be employed as described above, to reverse the polarity of the signals applied across the opposed ends of the slide wire of the Green potentiometer 46. With the movable arms 163f and 174f of switch 166 in respective engagement with fixed contacts 163d and 174d, a relatively small difference of potential exists across Green potentiometer 46 with the result that a large increment of movement of tap 46b induced by a relatively large change in the position of the mobile craft is required to create an appreciable or measurable change in the amplitude of the output signal from the potentiometer 46. Hence, the described position of the switch 166 may be termed its low sensitivity position. Due to the fact that only a small signal is applied across potentiometers 46, the trace on the screen of the cathode ray tube will be deflected to the edge of the screen only when the movable tap 46b is displaced from the grounded center of the slide wire of the potentiometer 46 by a large amount, that is to say, only when a large difference exists between the reading of preplot counter 38 and that of the Green phase meter 31 and its associated lane counter 33. In the apparatus illustrated in Fig. 4, the value of the series connected resistors of the voltage divider networks 51a and 52a are so selected that full scale deflection of the electron beam will occur when the target point T is separated from the initial position P of the mobile craft by 5 lanes of the Green family and, hence, numeral 5 appears adjacent the contacts 163d and 174d. Thus, the switch 166 is placed in the described position whenever the mobile craft is within 5 lanes of the Green family from the target point.

In like manner, the movable arms 163f and 174f of the Green range switch 166 are placed in engagement with stationary contacts 163c and 174c when the craft moves within two and one-half lanes of the Green family from the target position, at which time a somewhat larger difference of potential developed across resistors 152 and 153 and across resistors 157 and 158 is applied across potentiometer 46 and less movement of the mobile craft is required to produce a measurable change in the amplitude of the output signal from the Green potentiometer. Thus, the numeral 2.5 has been placed adjacent contacts 163c and 174c. When the craft is within one Green lane of the target point, the movable arms 163f and 174f are moved into engagement with stationary contacts 163b and 174b, respectively, at which time, full scale deflection of the electron beam of the cathode ray tube occurs when the mobile craft is separated from the target point T by one Green lane. Finally, when arms 163f and 174f are in respective engagement with fixed contacts 163a and 174a, a large difference of potential exists across the Green potentiometer 46 and a small increment of movement of the craft induces a relatively large change in the amplitude of the output signal from the potentiometer. Thus, the latter position of the switch 166 is termed the high sensitivity position and, to avoid deflection of the beam off the screen of the cathode ray tube, is employed only when the craft is within one-half of a Green lane of the target point. From the above description it is apparent that as the mobile craft approaches the target point T from a distance of two and one-half Green lanes or more, the switch 166 is successively moved in steps from its low sensitivity to its high sensitivity position in order to provide for maximum deflection of the trace on the screen, thereby to facilitate interpretation of the information presented on the screen.

The Red range switch 168 may be similarly controlled to vary the amplitude of the potential difference applied across the Red potentiometer 45 from terminals 54a and 54b on the terminal plate 54. Thus, as the mobile craft approaches the target position, the Red range switch is also moved from position to position in correlation with the number of lanes of the Red family separating the mobile craft from the target point. It should be understood that the Red and Green range switches do not necessarily occupy the same switch positions since, in some instances, it is entirely possible for the craft to be four or five Green lanes away from the target point T while being within one-half of a Red lane of that point. In such cases the Green range switch is placed in the low sensitivity position and the Red range switch in the high sensitivity position. Thus, the Red and Green range switches are operated entirely independently of each other.

However, when the mobile craft is separated from the target point by approximately the same number of Red and Green lanes it is desirable to provide for similar increases in the sensitivities of the output signals of potentiometers 45 and 46 and to avoid the necessity for operating two different switches to effect the desired control. To this end, the range switch 164 may be moved from the "off" position to render the Green and Red range switches 166 and 168 ineffective to supply signals for energizing the potentiometers 45 and 46. With the range switch 164 in its low sensitivity position, that is, with the movable arms of all four of its sections in engagement with the stationary contacts bearing reference numerals suffixed by the letter "d," unidirectional signals of equal and relatively low amplitude are applied across the potentiometers 45 and 46 with the result that appreciable movement of the craft is required in order to induce a measurable change in the output signals from these potentiometers. As the craft approaches the target position, the range switch 164 is successively moved in steps until it eventually reaches its high sensitivity position whereupon high amplitude, unidirectional signals are applied across potentiometers 45 and 46. Obviously, the range switch 164 is placed in the high sensitivity position only when the craft is separated from the target point by one-half lane or less of both the Red and Green families.

As previously indicated, the output signals of the Red and Green potentiometers 45 and 46 are applied through the deflection reversing switch 63 to the vertical and horizontal deflection channels 65 and 66 of the visual indicating means 36. Thus, the unidirectional signals appearing between terminal 36a and ground are applied through conductor 71 and through grid dropping resistor 72 (Fig. 5) to the control grid of pentode 73 of the paraphase amplifier 70. As previously mentioned, it is the function of the latter amplifier to convert the half wave rectified input signals to a pair of in-phase balanced output signals of equal amplitude but opposite polarity suitable for energizing the push-pull amplifier 80. To this end, the cathode of pentode 73 is connected directly to the cathode of pentode 74 and through cathode resistor 75, through vertical linearity control potentiometer 76 and through conductor 183 to the low side of a low voltage power supply 180 (Fig. 4) which supplies filament and D. C. operating voltages for the various vacuum tubes embodied in the vertical and horizontal deflection channels 65 and 66. The cathodes are maintained slightly positive with respect to the control grids so that the tubes 73 and 74 are operating in the linear portion of their grid voltage-plate current curves. Thus, the unidirectional signal supplied to the control grid of pentode 73, which, as indicated above, may be either positive or negative depending upon the polarity of the output signal of the displacement potentiometer connected to conductor 71, induces a flow of plate current through plate load resistor 77 to develop a unidirectional signal between junction 77a and ground having an opposite polarity from the input signal. To facilitate the ensuing description, it will be assumed that the input signal is positive and, accordingly, the plate current of pentode 73 flowing through the cathode resistor 75 and through potentiometer 76 is increased in order to drive the cathodes of the pentodes 73 and 74 in a positive direction. Obviously, if the input signal is negative, plate current is decreased and the cathodes of pentodes 73 and 74 are driven in a negative direction.

Since the control grid of pentode 74 is connected to ground through resistor 78, when its cathode is driven in a positive direction, plate current flow through plate load resistor 79 is decreased and, accordingly, the voltage on the plate of pentode 74 rises. Thus, the signals appearing between junction 79a and ground at the output of pentode 74 appear as positive unidirectional signals as shown in Fig. 4. The pentodes and their associated circuit parameters are so selected that the unidirectional signals appearing at points 77a and 79a are of approximately equal amplitude even though they possess opposite polarities and, accordingly, the single half-wave rectified input voltage is transformed into a pair of balanced unidirectional output signals for driving the succeeding push-pull amplifier circuits described below.

A vertical gain adjusting potentiometer 81 and a fixed dropping resistor 82 are connected in parallel with the plate load resistors 77 and 79 in order to facilitate adjustment of the gain of the vertical deflection channel 65. Thus, as the resistance of potentiometer 81 is decreased, the plate current from pentodes 73 and 74 is diverted from the plate load resistors 77 and 79 and the amplitude of the signals appearing at points 77a and 79a is decreased. Correspondingly, as the resistance of potentiometer 81 is increased the flow of plate current through resistors 77 and 79 increases with the result that signals of increased amplitude appear at points 77a and 79a. Thus, the potentiometer 81 may be employed to control the gain of the paraphase amplifier 70 in order to control the amplitude of the output signals fed to the push-pull amplifier 80.

To provide D. C. excitation potential for the plates of pentodes 73 and 74, the junction of plate load resistors 77 and 79 is connected through a dropping resistor 83 and through conductor 184 to the high side V of the low voltage power supply 180. In order to facilitate adjustment of the D. C. screen voltage supplied to the pentodes 73 and 74 thereby to provide for equal gain of the tubes and to insure the development of equal amplitude signals at points 77a and 79a, the screen grids are connected to the opposed ends of a vertical balancing potentiometer 84 having its variable tap connected to the high side of the low voltage power supply 180 through a dropping resistor 85. Condensers 86 and 87 are provided to by-pass undesired high frequency currents from the plate and screen circuits in conventional manner.

The output of the paraphase amplifier 70, comprising a pair of balanced, oppositely polarized, unidirectional, in-phase, equal amplitude signals, is applied through connectors 70a and 70b to the push-pull amplifier 80 which is a two-stage amplifier consisting of a first pair of triodes 89 and 90 and a second pair of triodes 91 and 92 each connected in push-pull arrangement. Since the operation of these stages will be apparent to those skilled in the art, they will be considered only briefly. Thus, the signals from the paraphase amplifier 70 are applied directly to the control grids of the triodes 89 and 90, the cathodes of these tubes being connected to the opposed ends of a vertical centering potentiometer 93 by-passed by an RC network consisting of resistor 94 and capacitor 95. The variable tap of the centering potentiometer is connected to the low side of the low voltage power supply through a suitable isolating resistor. The triodes 89 and 90 function to amplify the input signals in the usual manner with the result that the output signals appearing upon the plates of these tubes are inverted in polarity from the input signals. However, the polarity inversion occurring at the second push-pull stage including triodes 91 and 92 produces signals appearing upon output connectors 80a and 80b which are of the same polarity as the input signals to the triodes 89 and 90. The two unidirectional output signals produced by the push-pull amplifier 80 are in phase with each other, are of equal amplitude and are of opposite polarity as indicated by the typical wave forms illustrated adjacent the signal connectors 80a and 80b in Fig. 5. As indicated above, these unidirectional output signals are applied to the vertical deflection plates 64a and 64b of the cathode ray tube 64.

The cathode ray tube 64 and its associated circuits are conventional and comprise a grid connected through resistor 96 and through conductor 185 to the negative side Z of a high voltage power supply 182 (Fig. 4). A plurality of resistors comprising a voltage divider network indicated generally as 97 are connected between the high and low sides of the high voltage power supply 182. To provide for operation of the cathode of the cathode ray tube at an adjustable potential somewhat more positive than the potential applied to the grid, the former is connected to an intensity control potentiometer 98 forming a part of the voltage divider network 97. The focusing control of the cathode ray tube is connected to focusing potentiometer 99 also embodied in the voltage divider network 97 in order to adjust the concentration of the electron beam emanating from the cathode, thereby to control the focus of the beam. The accelerating anodes of the cathode ray tube are connected through resistor 186 to the high voltage side of the power supply 180.

In view of the foregoing description, the operation of the paraphase amplifier 100 and the push-pull amplifier 110 in the horizontal deflection channel 66 will be apparent. However, in order to facilitate understanding of the circuits employed, the component elements have been assigned reference numerals corresponding to those of similar elements performing the same functions in the vertical deflection channel 65 described above but prefixed by the numeral 2. Thus, the pentodes of the paraphase amplifier 100, which function in a manner similar to the pentodes 73 and 74 of the paraphase amplifier 70, have been assigned reference numerals 273 and 274, the horizontal balancing potentiometer, which corresponds to vertical balancing potentiometer 84, has been assigned reference numeral 284 and so on.

To consider briefly the adjustment of the circuits shown in Figs. 4 and 5 to establish proper operating characteristics for the indicating apparatus 16, the preplot counters 37 and 38 are first adjusted until their readings respectively correspond to those of the phase meters 30 and 31 and the lane counters 32 and 33 at which time no signals are developed by the displacement potentiometers 45 and 46. In the absence of input signals to the vertical and horizontal deflection channels 65 and 66, the vertical positioning potentiometer 93 and the horizontal positioning potentiometer 293 are adjusted until the electron beam of the cathode ray tube produces a small dot at the center of the screen. The focusing and intensity controls 98 and 99 of the cathode ray tube are next adjusted to suit the operator. With the vertical gain control 81 and the horizontal gain control 281 set for minimum gain, the vertical balance potentiometer 84 is adjusted until the plate voltages of pentodes 73 and 74 are equal and, thereafter, the horizontal balance potentiometer 284 is adjusted until the plate voltages of pentodes 273 and 274 are equal. These plate voltages may be measured with a suitable instrument such as a vacuum tube voltmeter.

The voltages developed between terminal 50a and ground and between terminal 50b and ground at the output of the sweep generator 50 are measured by connecting suitable voltage measuring instruments between each of the jacks 187 and 188 and ground. These voltages are equalized by adjusting the sweep potentiometers 151 and 156. The preplot counter may then be set to provide equal output signals from the Red and Green potentiometers 45 and 46 for application to the deflection channels 65 and 66. The gain control potentiometers 81 and 281 are then separately and individually adjusted to effect maximum deflection of the trace on the screen of the cathode ray tube.

Preplot counters 37 and 38 are next set so that the readings thereon differ from those on phase meters 30 and 31 and their associated lane counters 32 and 33 by one-half lane, after which the range switches 166 and 168 are placed in the high sensitivity positions and the sweep potentiometers 151 and 156 are adjusted to provide full scale deflection of the trace appearing on the screen of the cathode ray tube while at the same time maintaining equal voltages between each of the jacks 187 and 188 and ground. If the trace is not a straight line, the horizontal and vertical linearity potentiometer 76 and 276 may be adjusted until a linear sweep is produced. The equipment is then ready for operation.

In the operation of the equipment described above, the polarity reversing switches 60 and 61 and the deflection reversing switch 63 are initially set in accordance with the conditions existing in the particular area in which the mobile craft 14 is being navigated. Unless the craft moves to an entirely different area, these three switches will not have to be disturbed. With the craft at point P, the preplot counters 37 and 38 are adjusted until their readings correspond to the hyperbolic coordinates of the target point T as derived from the chart of the area. If the mobile craft is located in excess of two and one-half Red lanes and two and one-half Green lanes from the target point the range switch 164 is set to its low sensitivity position to supply low amplitude signals to potentiometers 45 and 46. In the event that independent control of the voltages supplied to potentiometers 45 and 46 is desired, the range switch 164 is thrown to its "off" position and the Green and Red range switches 166 and 168 are employed in the manner described above. Thus, in the problem illustrated in Fig. 1, the range switch 164 is placed in the "off" position, the Red range switch 168 is placed in the 5 lane position and the Green range switch 166 is placed in the 1 lane position.

After the preplot counters and range switches have been set, the cursor 67 is moved into alignment with the trace on the screen and the craft is navigated by attempting to maintain the trace directly beneath the cursor. As the craft moves, the indications on the phase meters 30 and 31 and lane counters 32 and 33 change to reduce the amplitudes of the output signals from potentiometers 45 and 46. Hence, the trace will gradually shorten as the craft approaches the target point which, on the screen of the cathode ray tube, is represented by the end of the trace at the center. If the trace moves out of alignment with the cursor 67, steps are immediately taken to guide the mobile craft back to the desired course. As the craft approaches the target point, the range switches are employed successively to increase the amplitude of the output signals from potentiometers 45 and 46, thereby to increase the sensitivity of the indications appearing on the cathode ray tube. For each setting of the range switches, the length of the trace will gradually decrease until, with the range positions in the high sensitivity position, the mobile craft reaches the target point at which time a dot will be produced at the center of the screen. Thus, the presentation appearing on the cathode ray tube creates the impression upon the operator that he is actually viewing a two dimensional picture representative of the progress of the craft towards the target point. Accordingly, the indications may be readily and accurately interpreted and the craft may be directed to the desired destination without waste of time and effort.

From the foregoing description, it will be apparent that the apparatus described above is particularly well suited for the solution of navigation problems where the distance to the target point is not too great. Thus, this apparatus is quite useful in conducting a geophysical survey of an area wherein it is desired to detonate explosives from a series of shot points spaced relatively close together along one or more specified lines. In such operations, the shot points are transformed into hyperbolic position coordinates by reference to the geographical chart. The mobile craft is then navigated along one or more direct lines from shot point to shot point in the desired sequence by use of the apparatus of the present invention in the manner described above.

While a particular embodiment of the invention has been shown and described, it will be understood, of course, that the invention is not limited thereto since many modifications may be made and it is therefore contemplated by the appended claims to cover any such modification as fall within the true spirit and scope of the invention.

What is claimed as new and desired to be secured by Letters Patent of the United States is:

1. Apparatus for use in radio position finding systems to assist in the navigation of a mobile craft to any selected future position, which apparatus comprises means for providing a pair of outputs representative of intersecting radio position lines defining the location of the craft, settable means for providing a pair of outputs representative of intersecting radio position lines defining the selected future position, and means jointly responsive to all four of said outputs for continuously indicating the progress of said craft as it approaches said future position, said last named means including a cathode ray tube for providing a continuous visual representation of the relationship between the location of said craft and said future position.

2. Apparatus for use in radio position finding systems to assist in the navigation of a mobile craft to any selected future position, which apparatus comprises means for providing a pair of outputs representative of intersecting radio position lines defining the location of the craft; settable means for providing a pair of outputs representative of intersecting radio position lines defining the selected future position; and means jointly responsive to all four of said outputs for continuously indicating the progress of said craft as it approaches said future position, said last named means including a cathode ray tube, and means for deflecting the electron beam of said cathode ray tube by an amount corresponding to the distance between the location of said craft and said future position, thereby to provide a continuous visual representation of the relationship between said craft and said future position.

3. Apparatus for use in radio position finding systems to assist in the navigation of a mobile craft to any selected future position, which apparatus comprises means for providing at least one output varying in accordance with the geographical position of the craft, settable means for providing at least one output corresponding to the future position of the craft, and indicating means jointly responsive to both of said outputs for continuously indicating the progress of said craft as it approaches said future position, said last named means including a cathode ray tube for providing a continuous visual representation of the relationship between the position fo said craft and said future position.

4. Apparatus for use in radio position finding systems to assist in the navigation of a mobile craft to any selected future position, which apparatus comprises means for providing at least one output varying in accordance with the geographical position of the craft; settable means for providing at least one output corresponding to the future position of the craft; and indicating means jointly responsive to both of said outputs for continuously indicating the progress of said craft as it approaches said future position, said last named means including a cathode ray tube, and means for deflecting the electron beam of said cathode ray tube by an amount corresponding to the distance between the location of said craft and said future position, thereby to provide a continuous visual representation of the relationship between said craft location and said future position.

5. Apparatus for use in radio position finding systems of the hyperbolic type in order to assist in the navigation of a mobile craft to any selected future position, which apparatus comprises means for providing a pair of outputs respectively representative of hyperbolic coordinates passing through the location of the craft, settable means for providing a pair of signals respectively representative of hyperbolic coordinates passing through said selected future position of the craft, and means jointly responsive to all four of said outputs for continuously indicating the progress of said craft as it moves towards said selected future position, the last mentioned means including a cathode ray tube for providing a continuous visual representation of the relationship between the location of the craft and said future position.

6. Apparatus for use in radio position finding systems of the hyperbolic type in order to assist in the navigation of a mobile craft to any selected future position, which apparatus comprises means for providing a pair of outputs respectively representative of hyperbolic coordinates passing through the location of the craft; settable means for providing a pair of signals respectively representative of hyperbolic coordinates passing through said selected future position of the craft; and means jointly responsive to all four of said outputs for continuously indicating the progress of said craft as it moves towards said selected future position, the last mentioned means including a cathode ray tube, and means for deflecting the electron beam of said cathode ray tube by an amount continuously corresponding to the distance between said craft location and said future position, thereby to provide a continuous visual representation of the relationship between the location of the craft and the future position.

7. Apparatus for use in radio position finding systems to assist in the navigation of a mobile craft from a geographical position defined by a first pair of intersecting radio position coordinates to any desired future position defined by a second pair of intersecting radio position coordinates, which apparatus comprises means for developing a signal varying in accordance with the difference between one of the coordinates of the first pair and one of the coordinates of the second pair, means for developing a signal varying in accordance with the difference between the other coordinate of the first pair and the other coordinate of the second pair, and means jointly responsive to both of said signals for continuously indicating the progress of said craft as it approaches said future position, the last mentioned means including a cathode ray tube for providing a continuous visual representation of the relationship between the location of said craft and said future position.

8. Apparatus for use in radio position finding systems to assist in the navigation of a mobile craft from a geographical position defined by a first pair of intersecting radio position coordinates to any desired future position defined by a second pair of intersecting radio position coordinates, which apparatus comprises, means for developing a first signal varying in accordance with the difference between one of the coordinates of the first pair and one of the coordinates of the second pair; means for developing a second signal varying in accordance with the difference between the other coordinate of the first pair and the other coordinate of the second pair; and means jointly responsive to both of said signals for continuously indicating the progress of said craft as it approaches said future position, the last mentioned means including a cathode ray tube and horizontal and vertical deflection circuits associated therewith respectively responsive to said first and second signals, thereby to provide a trace on the screen of said cathode ray tube having a length continuously corresponding to the distance between the location of said craft and said future position.

9. Apparatus for use in radio position finding systems to assist in the navigation of a mobile craft from a geographical position defined by a first pair of intersecting radio position coordinates to any desired future position defined by a second pair of intersecting radio position coordinates, which apparatus comprises, means for developing a first signal varying in accordance with the difference between one of the coordinates of the first pair and one of the coordinates of the second pair; means for developing a second signal varying in accordance with the difference between the other coordinate of the first pair and the other coordinate of the second pair; and means jointly responsive to both of said signals for continuously indicating the progress of said craft as it approaches said future position, the last mentioned means including a cathode ray tube and horizontal and vertical deflection circuits respectively responsive to said first and second signals for deflecting the electron beam of the tube by an amount and direction which is a function of the relative values of said first and second signals, thereby to provide a continuous visual representation of the distance between the location of said craft and said future position.

10. Apparatus for use in radio position finding systems to assist in the navigation of a mobile craft from a geographical position defined by a first pair of intersecting radio position coordinates to any desired future position defined by a second pair of intersecting radio position coordinates, which apparatus comprises, means for developing a first signal having an amplitude varying in accordance with the difference between one of the coordinates of the first pair and one of the coordinates of the second pair and having a polarity which is a function of the relative values of said one coordinates; means for developing a second signal having an amplitude varying in accordance with the difference between the other coordinate of the first pair and the other coordinate of the second pair and having a polarity which is a function of the relative values of said other coordinates; and means jointly responsive to both of said signals for continuously indicating the progress of said craft as it approaches said future position, the last mentioned means including a cathode ray tube and horizontal and vertical deflection circuits associated therewith respectively responsive to said first and second signals for deflecting the electron beam of said tube by an amount which is a function of the amplitudes of said first and second signals and in a direction which is a function of both the amplitudes and polarities of said first and second signals, thereby to provide a continuous visual indication of the distance between the location of said craft and said future position and also to provide an indication of deviation of said craft from a direct course to said future position.

11. Apparatus for use in radio position finding systems to assist in the navigation of a mobile craft from a geographical position defined by a first pair of intersecting radio position coordinates to any desired future position defined by a second pair of intersecting radio position coordinates, which apparatus comprises, means for developing a first signal having an amplitude varying in accordance with the difference between one of the coordinates of the first pair and one of the coordinates of the second pair and having a polarity which is a function of the relative values of said one coordinates; means for developing a second signal having an amplitude varying in accordance with the difference between the other coordinate of the first pair and the other coordinate of the second pair and having a polarity which is a function of the relative values of said other coordinates; and means jointly responsive to both of said signals for continuously indicating the progress of said craft as it approaches said future position, the last mentioned means including a cathode ray tube and deflection circuits associated therewith respectively responsive to said first and second signals for deflecting the electron beam of said tube by an amount which is a function of the amplitudes of said first and second signals and in a direction which is a function of both the amplitudes and polarities of said first and second signals, whereby the length of the trace appearing on the screen of said tube is continuously indicative of the distance between the location of said craft and said future position, said future position being represented by the end of the trace appearing near the center of the screen and a change in the angular position of said trace on said screen being indicative of deviation of said craft from a direct course to said future position.

12. Apparatus for use in radio position finding systems to assist in the navigation of a mobile craft to any selected future position, which apparatus comprises means for providing a first pair of outputs varying in accordance with the geographical position of the craft; settable means for providing a second pair of outputs corresponding to the future position of the craft; means jointly responsive to one of the outputs of the first pair and to one of the outputs of the second pair for developing a first signal varying in accordance with the difference therebetween; means jointly responsive to the other output of the first pair and to the other output of the second pair for developing a second signal varying in accordance with the difference therebetween; and means jointly responsive to both of said signals for continuously indicating the progress of said craft as it approaches said future position, said last named means including a cathode ray tube and horizontal and vertical deflection circuits associated therewith respectively responsive to said first and second signals, thereby to provide a trace on the screen of said cathode ray tube having a length continuously corresponding to the distance between the location of said craft and said future position.

13. Apparatus for use in radio position finding systems to assist in the navigation of a mobile craft to any selected future position, which apparatus comprises means for providing a first pair of outputs varying in accordance with the geographical position of the craft; settable means for providing a second pair of outputs corresponding to the future position of the craft; means jointly responsive to one of the outputs of the first pair and to one of the outputs of the second pair for developing a first signal varying in accordance with the difference therebetween; means jointly responsive to the other output of the first pair and to the other output of the second pair for developing a second signal varying in accordance with the difference therebetween; and means jointly responsive to both of said signals for continuously indicating the progress of said craft as it approaches said future position, said last named means including a cathode ray tube and horizontal and vertical deflection circuits respectively responsive to said first and second signals for deflecting the beam of the cathode ray tube by an amount and direction which is a function of the relative values of said first and second signals, thereby to provide a continuous visual representation of the distance between the location of said craft and said future position.

14. Apparatus for use in radio position finding systems to assist in the navigation of a mobile craft to any selected future position, which apparatus comprises means for providing a first pair of outputs respectively representative of radio position lines defining the geographical position of the craft; settable means for providing a second pair of outputs corresponding to radio position lines defining said future position of the craft; means for developing a first signal having an amplitude corresponding to the difference between one of the outputs of the first pair and one of the outputs of the second pair and having a polarity which is a function of the relative values of said one outputs; means for developing a second signal having an amplitude corresponding to the difference between the other output of the first pair and the other output of the second pair and having a polarity which is a function of the relative values of said other outputs; and indicating means jointly responsive to both of said signals for indicating the progress of said mobile craft as it approaches the selected future position, said last named means including a cathode ray tube and horizontal and vertical deflection circuits associated therewith respectively responsive to said first and second signals for deflecting the electron beam of said cathode ray tube by an amount which is a function of the amplitudes of said first and second signals and in a direction which is a function of both the amplitudes and polarities of said first and second signals, thereby to provide a continuous visual indication of the distance between the location of said craft and said future position and also to provide an indication of deviation of said craft from a direct course to said future position.

15. Apparatus for use in radio position finding systems to assist in the navigation of a mobile craft to any selected future position, which apparatus comprises means for providing a first pair of outputs respectively representative of radio position lines defining the geographical position of the craft; settable means for providing a second pair of outputs respectively corresponding to radio position lines defining said future position of the craft; means for developing a first unidirectional signal having an amplitude corresponding to the difference between one of the outputs of the first pair and one of the outputs of the second pair and having a polarity which is a function of the relative values of said one outputs; means for developing a second unidirectional signal having an amplitude corresponding to the difference between the other output of the first pair and the other output of the second pair and having a polarity which is a function of the relative values of said other outputs; and indicating means jointly responsive to both of said signals for indicating the progress of said mobile craft as it approaches the selected future position, said last named means including a cathode ray tube and horizontal and vertical deflection circuits associated therewith respectively responsive to said first and second signals for deflecting the electron beam of said cathode ray tube by an amount which is a function of the amplitudes of said first and second signals and in a direction which is a function of both the amplitudes and polarities of said first and second signals, whereby the length of the trace appearing on the screen of said cathode ray tube is continuously indicative of the distance between the location of said craft and said future position, said future position being represented by the end of said trace appearing near the center of the screen and variations in the angular orientation of said trace on said screen being indicative of deviation of said craft from a direct course to said future position.

16. Apparatus for use in radio position finding systems of the hyperbolic type to assist in the navigation of a mobile craft from a geographical position defined by a first pair of hyperbolic radio position coordinates to any desired future position defined by a second pair of hyperbolic radio position coordinates, which apparatus comprises means for developing a first signal varying in accordance with the difference between a first of the hyperbolic coordinates passing through the craft location and a first of the hyperbolic coordinates passing through the future position, means for developing a second signal varying in accordance with the difference between a second of the hyperbolic coordinates passing through the location of the craft and a second of the hyperbolic coordinates passing through the selected future position, and means jointly responsive to both of said signals for continuously indicating the progress of said craft as it approaches said future position, the last mentioned means including a cathode ray tube for providing a continuous visual representation of the relationship between the location of said craft and said future position.

17. Apparatus for use in radio position finding systems of the hyperbolic type to assist in the navigation of a mobile craft from a geographical position defined by a first pair of hyperbolic radio position coordinates to any desired future position defined by a second pair of hyperbolic radio position coordinates, which apparatus comprises, means for developing a first signal varying in accordance with the difference between a first of the hyperbolic coordinates passing through the craft location and a first of the hyperbolic coordinates passing through the future position; means for developing a second signal varying in accordance with the difference between a second of the hyperbolic coordinates passing through the location of the craft and a second of the hyperbolic coordinates passing through the selected future position; and means jointly responsive to both of said signals for continuously indicating the progress of said craft as it approaches said future position, the last mentioned means including a cathode ray tube and horizontal and vertical deflection circuits associated therewith respectively responsive to said first and second signals, thereby to provide a trace on the screen of said cathode ray tube having a length continuously corresponding to the distance between the location of said craft and said future position.

18. Apparatus for use in radio position finding systems of the hyperbolic type to assist in the navigation of a mobile craft from a geographical position defined by a first pair of hyperbolic radio position coordinates to any desired future position defined by a second pair of hyperbolic radio position coordinates, means for developing a first signal having an amplitude varying in accordance with the difference between a first of the hyperbolic coordinates passing through the craft location and a first of the hyperbolic coordinates passing through the future position and having a polarity which is a function of the algebraic difference between said first coordinates, means for developing a second signal having an amplitude varying in accordance with the difference between a second of the hyperbolic coordinates passing through the location of the craft and a second of the hyperbolic coordinates passing through the selected future position and having a polarity which is a function of the algebraic difference between said second coordinates; and means jointly responsive to both of said signals for continuously indicating the progress of said craft as it approaches said future position, the last mentioned means including a cathode ray tube and horizontal and vertical deflection circuits associated therewith respectively responsive to said first and second signals for deflecting the electron beam of said tube by an amount which is a function of the amplitudes of said first and second signals and in a direction which is a function of both the amplitudes and polarities of said first and second signals, thereby to provide a continuous visual indication of the distance between the location of said craft and said future position and also to provide an indication of deviation of said craft from a direct course to said future position.

19. Apparatus for use in radio position finding systems to assist in the navigation of a mobile craft to any selected future position, which apparatus comprises, means for providing a first pair of outputs continuously representative of intersecting radio position lines defining the geographical position of the craft; settable means for providing a second pair of outputs representative of intersecting radio position lines defining the future position of the craft, means jointly responsive to one of the outputs of the first pair and to one of the outputs of the second pair for developing a first signal varying in accordance with the difference therebetween; means jointly responsive to the other output of the first pair and to the other output of the second pair for developing a second signal varying in accordance with the difference therebetween; and means jointly responsive to both of said signals for continuously indicating the progress of said craft as it approaches said future position, the last mentioned means including a cathode ray tube and horizontal and vertical deflection circuits associated therewith respectively responsive to said first and second signals, thereby to provide a trace on the screen of said cathode ray tube having a length continuously corresponding to the distance between the location of said craft and said future position.

20. Apparatus for use in radio position finding systems to assist in the navigation of a mobile craft to any selected future position, which apparatus comprises, means for providing a first pair of outputs continuously representative of intersecting radio position lines defining the geographical position of the craft; settable means for providing a second pair of outputs representative of intersecting radio position lines defining the future position of the craft; means jointly responsive to one of the outputs of the first pair and to one of the outputs of the second pair for developing a first signal having an amplitude varying in accordance with the difference therebetween and having a polarity which is a function of the relative values of said one outputs; means jointly responsive to the other output of the first pair and to the other output of the second pair for developing a second signal having an amplitude varying in accordance with the difference therebetween and having a polarity which is a function of the relative values of said other outputs; and means jointly responsive to both of said signals for continuously indicating the progress of said craft as it approaches said future position, the last mentioned means including a cathode ray tube and horizontal and vertical deflection circuits associated therewith respectively responsive to said first and second signals for deflecting the electron beam of said tube by an amount which is a function of the amplitudes of said first and second signals and in a direction which is a function of both the amplitudes and polarities of said first and second signals, thereby to provide a continuous visual indication of the distance between the location of said craft and said future position and also to provide an indication of deviation of said craft from a direct course to said future position.

21. Apparatus for use in radio position finding systems of the hyperbolic type to assist in the navigation of a mobile craft to any selected future position, which apparatus comprises, means for providing a first pair of outputs representative of hyperbolic radio position coordinates defining the geographical position of the craft; settable means for providing a second pair of outputs representative of hyperbolic radio position coordinates defining the future position of the craft; means jointly responsive to one of the outputs of the first pair and to one of the outputs of the second pair for developing a first signal varying in accordance with the difference between a first of the hyperbolic coordinates passing through the craft location and a first of the hyperbolic coordinates passing through the future position; means jointly responsive to the other output of the first pair and to the other output of the second pair for developing a second signal varying in accordance with the difference between a second of the hyperbolic coordinates passing through the location of the craft and a second of the hyperbolic coordinates passing through the selected future position; and means jointly responsive to both of said signals for continuously indicating the progress of said craft as it approaches said future position, the last mentioned means including a cathode ray tube and horizontal and vertical deflection circuits associated therewith respectively responsive to said first and second signals, thereby to provide a trace on the screen of said cathode ray tube having a length continuously corresponding to the distance between the location of said craft and said future position.

22. Apparatus for use in radio position finding systems of the hyperbolic type to assist in the navigation of a mobile craft to any selected future position, which apparatus comprises, means for providing a pair of outputs representative of hyperbolic radio position coordinates defining the geographical position of the craft; settable means for providing a pair of outputs representative of hyperbolic radio position coordinates defining the future position of the craft; means jointly responsive to one of the outputs of the first pair and to one of the outputs of the second pair for developing a first signal having an amplitude varying in accordance with the difference between a first of the hyperbolic coordinates passing through the craft location and a first of the hyperbolic coordinates passing through the future position and having a polarity which is a function of the algebraic difference between said first coordinates; means jointly responsive to the other output of the first pair and to the other output of the second pair for developing a second signal having an amplitude varying in accordance with the difference between a second of the hyperbolic coordinates passing through the location of the craft and a second of the hyperbolic coordinates passing through the selected future position and having a polarity which is a function of the algebraic difference between said second coordinates; and means jointly responsive to both of said signals for continuously indicating the progress of said craft as it approaches said future position, the last mentioned means including a cathode ray tube and horizontal and vertical deflection circuits associated therewith respectively responsive to said first and second signals for deflecting the electron beam of said tube by an amount which is a function of the amplitudes of said first and second signals and in a direction which is a function of both the amplitudes and polarities of said first and second signals, thereby to provide a continuous visual indication of the distance between the location of said craft and said future position and also to provide an indication of deviation of said craft from a direct course to said future position.

23. The apparatus defined by claim 8 wherein switching means are provided for selectively supplying either of said first or second signals to the horizontal deflection circuit while supplying the remaining signal to the vertical deflection circuit, thereby to orient the trace upon the screen of the cathode ray tube.

24. The apparatus defined by claim 9 wherein switching means are provided for selectively supplying either of said first or second signals to the horizontal deflection circuit while supplying the remaining signal to the vertical deflection circuit, thereby to control the direction of deflection of the electron beam in order to orient the trace produced thereby in a direction corresponding to the desired course to be followed by said craft to reach said future position.

25. The apparatus defined by claim 10 wherein means including a manually operable switch are provided for selectively reversing the polarity of either of said first or second signals, and wherein switching means are also provided for selectively supplying either of said first or second signals to said horizontal deflection circuit while supplying the remaining signal to the vertical deflection circuit.

26. The apparatus defined by claim 12 wherein switching means are provided for selectively supplying either of said first or second signals to the horizontal deflection circuit while supplying the remaining signal to the vertical deflection circuit, thereby to orient the trace upon the screen of the cathode ray tube.

27. The apparatus defined by claim 17 wherein switching means are provided for selectively supplying either of said first or second signals to the horizontal deflection circuit while the remaining signal is supplied to the vertical deflection circuit, thereby to orient the trace upon the screen of the cathode ray tube.

28. The apparatus defined by claim 18 wherein means including a manually operable switch are provided for selectively reversing the polarity of either of said first or second signals, and wherein switching means are also provided for selectively supplying either of said first or second signals to said horizontal deflection circuit while supplying the remaining signal to the vertical deflection circuit.

References Cited in the file of this patent

UNITED STATES PATENTS

| | | |
|---|---|---|
| 2,472,129 | Streeter | June 7, 1949 |
| 2,508,565 | Chance | May 23, 1950 |
| 2,633,570 | Greenwood | Mar. 31, 1953 |
| 2,698,935 | Sitterly | Jan. 4, 1955 |
| 2,701,352 | Kingdon et al. | Feb. 1, 1955 |
| 2,724,099 | Harrison | Nov. 15, 1955 |